United States Patent [19]

Marks

[11] 4,000,833

[45] Jan. 4, 1977

[54] TONER DISPENSING APPARATUS

[75] Inventor: Robert G. Marks, East Walpole, Mass.

[73] Assignee: Itek Corporation, Lexington, Mass.

[22] Filed: Mar. 6, 1975

[21] Appl. No.: 555,919

[52] U.S. Cl. .............................. 222/105; 222/203; 222/325; 222/406; 222/412; 198/616

[51] Int. Cl.$^2$ .............................. B65G 33/14

[58] Field of Search .......... 222/202, 203, 231, 232, 222/325, 105, 412, 273, 274, 269, 270, 413, 406, DIG. 1; 198/64

[56] References Cited

UNITED STATES PATENTS

| | | | |
|---|---|---|---|
| 2,720,341 | 10/1955 | Stirn et al. | 222/203 X |
| 3,473,702 | 10/1969 | Molitor | 222/203 |
| 3,572,555 | 3/1971 | Knight et al. | 222/342 |
| 3,596,807 | 8/1971 | Hudson et al. | 222/202 |
| 3,622,054 | 11/1971 | Davidson | 222/231 X |
| 3,847,306 | 11/1974 | Howell et al. | 222/203 |

*Primary Examiner*—Robert B. Reeves
*Assistant Examiner*—Frederick R. Handren
*Attorney, Agent, or Firm*—Homer O. Blair; Robert L. Nathans; Gerald H. Glanzman

[57] ABSTRACT

A toner dispensing apparatus for electrophotographic copiers. The apparatus includes a toner dispenser portion positioned within the developer housing of the copier, and a toner supply portion positioned exteriorly of the developer housing. The two portions are detachably secured to one another such that when the supply of toner in the toner supply portion becomes exhausted, that portion may be replaced in its entirety. Both portions are provided with a novel valve means to permit transfer of toner from the supply portion to the dispenser portion in normal operation and to prevent toner spillage from either portion when separated. Additionally, a novel toner agitator structure is provided in the toner supply portion to ensure a smooth flow of toner therefrom. This structure includes a plastic bag for holding the supply of toner together with means for periodically deflecting the walls of the bag to loosen up the toner therein.

16 Claims, 5 Drawing Figures

TONER DISPENSING APPARATUS

BACKGROUND OF THE INVENTION

1. Field of the Invention

The present invention relates to an improved toner dispensing apparatus for electrophotographic copiers.

2. Description of the Prior Art

In commonly assigned U.S. patent application, Ser. No. 542,319 of Charles E. Myers and James E. Genthe filed on Jan. 20, 1975 and entitled "Toner Dispensing Apparatus", an apparatus for adding fresh toner to the cascade development system of an electrophotographic copier is described. As set forth in that application, the dispensing apparatus includes an elongated hollow tubular member positioned within and extending across the developer housing together with a toner supply container supported exteriorly of the developer housing. In addition, a rotatable auger of novel construction having a helical channel formed around its surface is positioned within both the tubular member and the supply container and is adapted to pick up fresh toner from the supply container and transport it into and along the tubular member to be automatically dispensed in precise amounts through a plurality of apertures extending along the bottom of the tubular member.

Although this system has proven to be quite effective in dispensing metered amounts of toner into the developer housing, investigations have shown that certain modifications are desirable to make it practical for use in a commercial copier. In particular, to be suitable for use in a convenience copier, it is highly desirable that the dispenser be designed to permit easy replacement or refilling of the toner supply housing when it becomes exhausted so that this activity may be carried out by untrained personnel with a minimum of machine downtime. Also, it is important that toner replenishment be accomplished in a manner that will minimize the danger of toner spillage as this cannot only contaminate the environment, but can also clog or damage parts of the machine itself. Finally, to accomplish the above goals, it is preferred that the toner supply housing portion of the dispenser be replaced in its entirety when it becomes depleted of toner, and this makes it important to keep the cost of the components within the toner supply housing as low as possible without sacrificing reliability.

SUMMARY OF A PREFERRED EMBODIMENT OF THE INVENTION

In accordance with the present invention, a toner dispenser which effectively incorporates all of the above desired features has been provided. In accordance with one aspect of the invention, the toner dispenser described in the above-mentioned U.S. patent application Ser. No. 542,319 has been modified to consist of two distinct parts; a toner dispensing portion and a toner supply portion. The toner dispensing portion is positioned totally within the developer housing in a substantially permanent manner, while the toner supply portion is located exteriorly of the developer housing and is adapted to be replaced in its entirety whenever a new supply of toner is needed.

In accordance with the presently most preferred embodiment, the auger is also formed in two sections which are adapted to be releasably coupled together for common rotation to transfer toner from the supply portion to the dispensing portion. In addition, a simple but effective valve is associated with the two dispenser portions to permit the transfer of toner from one portion to the other in normal operation while preventing any toner spillage from either portion during the replacement operation.

In accordance with a further aspect of the invention, a novel toner agitating structure has been incorporated within the toner supply portion to ensure a smooth flow of toner into the channels of the auger. The system provided requires only inexpensive components yet is very reliable and thus enables the cost of the replaceable toner supply portion to be kept to a minimum.

Further features of the invention will be emphasized hereinafter in conjunction with the following detailed description.

DETAILED DESCRIPTION OF THE PREFERRED EMBODIMENTS

Figure 1:
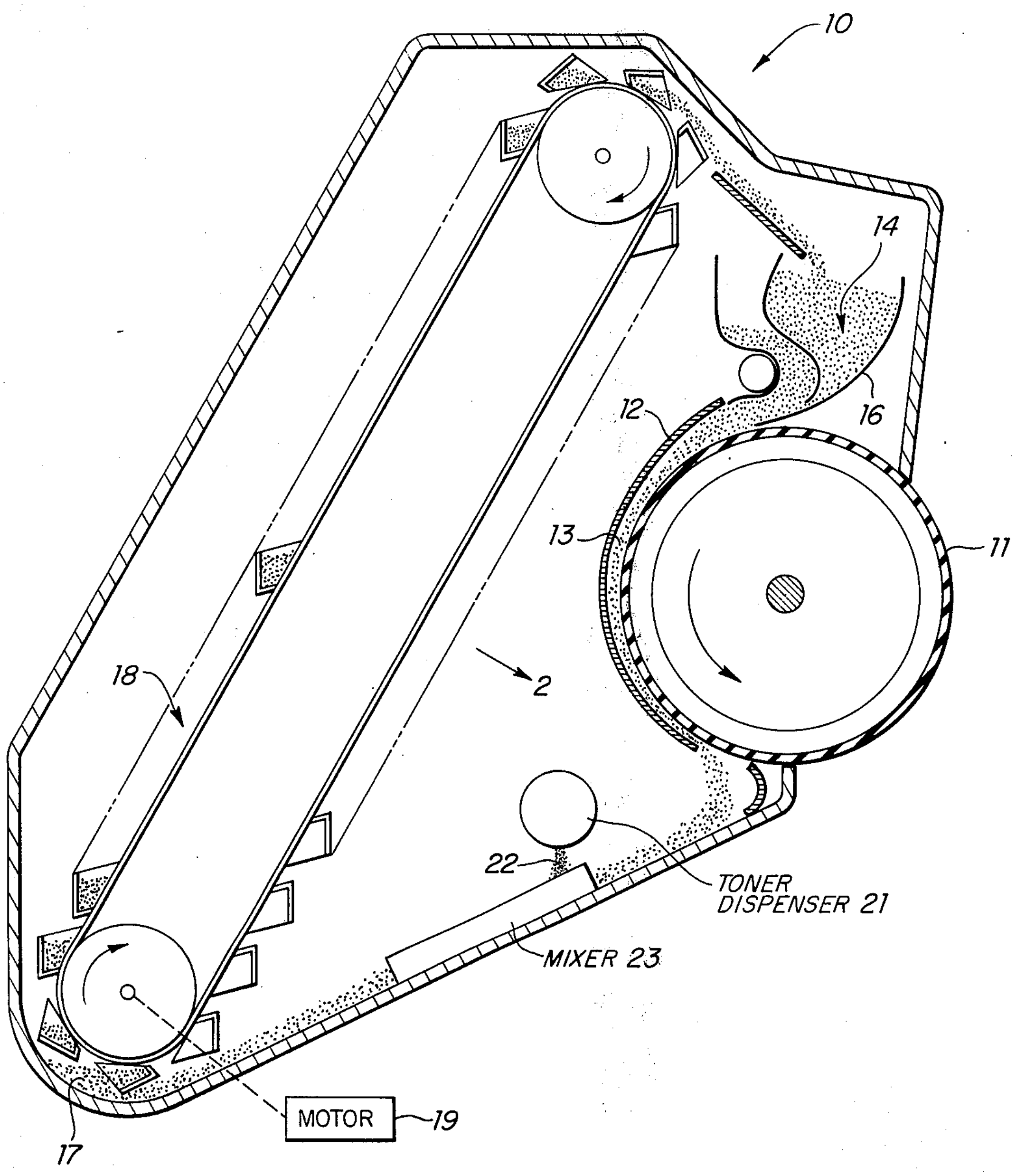
FIG. 1 schematically illustrates the developer assembly of an electrophotographic copier incorporating a toner dispensing apparatus according to the present invention.

FIG. 1 schematically illustrates the developer assembly of an electrophotographic copier. Other conventional portions of the copier such as the corona charging station, the exposure station, and the drum cleaning station as well as many of the details of the developer assembly itself have not been illustrated in the interest of clarity and because they are not relevant to an understanding of the present invention.

The developer assembly or housing is generally identified by reference number 10 and is adapted to cooperate with what may be a conventional rotatable xerographic drum 11 upon the surface of which a latent electrostatic image to be developed can be applied in a conventional manner. More specifically, the developer assembly 10 includes a development plate or electrode 12 which is spaced from the surface of drum 11 to define a development zone 13 within which development takes place. Development is accomplished by cascading a developer mixture 14 in the form of carrier and toner through the development zone 13 from a developer hopper 16 as is well understood. As the developer 14 cascades downwardly through the development zone, toner will be attracted to and deposited on the latent electrostatic image on the drum to develop it. After passing through the development zone, the developer thereafter falls to the bottom of the developer housing and accumulates in a conveyor sump portion 17 where it is adapted to be picked up by a suitable conveyor 18 driven by a motor 19 and transported back to the top of the developer housing to be re-cascaded through the development zone during later development operations.

As is well known, the obtaining of consistently high quality, fully developed images over an extended period of time requires that the developer mixture be maintained at the proper toner concentration at all times; and, since toner is removed from the developer mixture during development, it becomes necessary to add fresh toner to the system. An effective toner dispensing apparatus for accomplishing this has been previously described in detail in commonly assigned U.S. patent application Ser. No. 542,319 of Charles E. Myers and James E. Genthe, filed on Jan. 20, 1975 and entitled "Toner Dispensing Apparatus". As indicated above, the present invention is directed to a somewhat modified and improved version of the toner dispensing apparatus described in that application. This modified toner dispenser is schematically illustrated in FIG. 1 and is generally identified by reference number 21 and is positioned adjacent to the output end of the development zone 13 for reasons described in detail in the above-mentioned patent application. Dispenser 21 is adapted to dispense toner 22 into a cross-mixer 23 which assists in mixing the fresh toner with the developer 14 also passing through the mixer.

Figure 2:
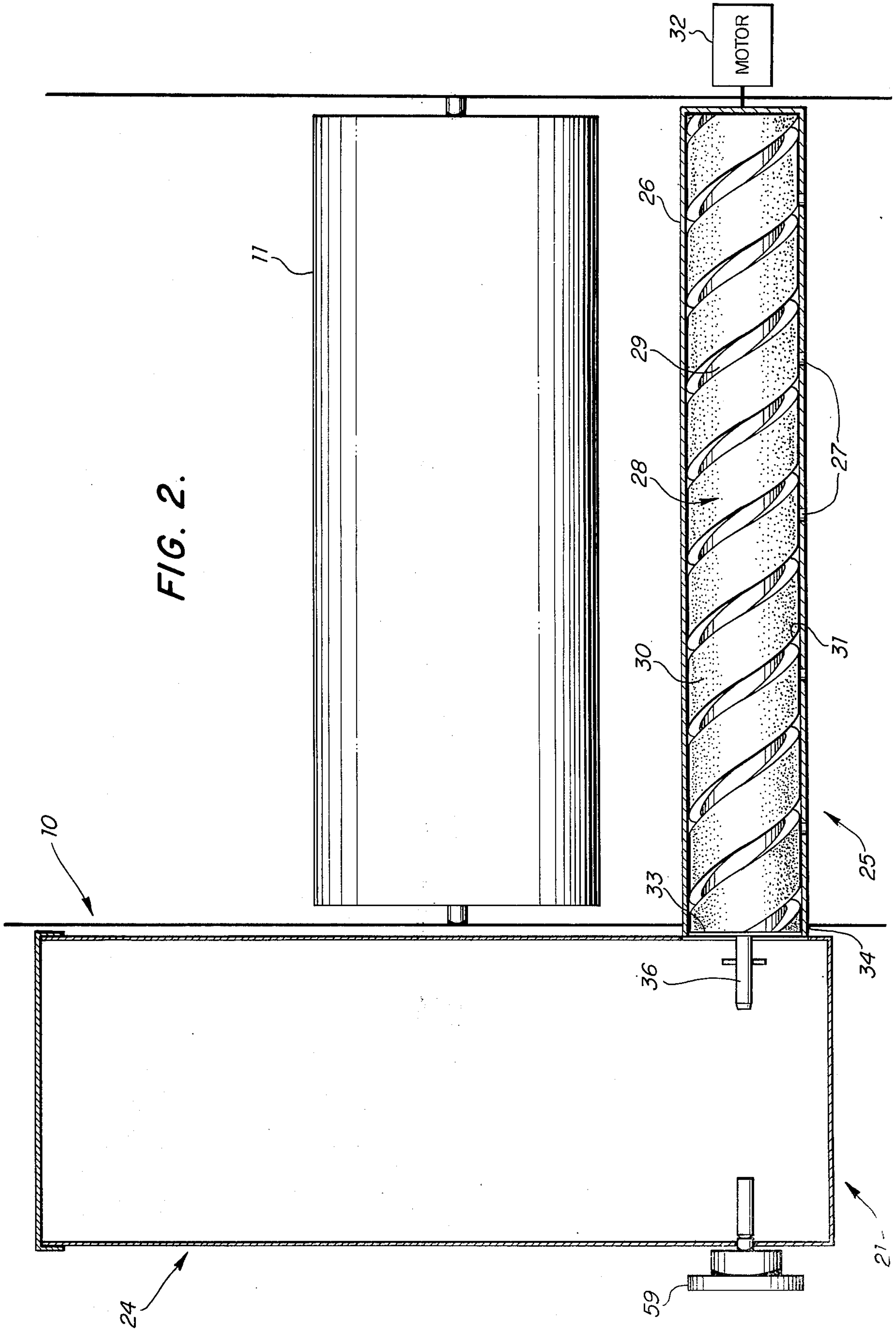
FIG. 2 illustrates the toner dispenser of the present invention looking generally in the direction of arrow 2 in FIG. 1, with portions being shown in cross-section for clarity.

Toner dispenser 21 and its orientation within the developer housing is illustrated more clearly in FIG. 2, which is a view of portions of the system looking generally in the direction of arrow 2 of FIG. 1, and in which some portions are shown in cross-section for clarity.

As illustrated in FIG. 2, the toner dispenser 21 according to the present invention consists of two distinct portions; a toner supply portion 24 and a toner dispensing portion 25. Toner supply portion 24 is located outside of the developer housing 10 while toner dispensing portion 25 is positioned within and extends substantially across the developer housing to dispense fresh toner into the developer mixture passing beneath it. Toner dispensing portion 25 is generally similar in construction to that described in the above-referenced patent application and comprises an elongated tubular housing 26 extending substantially across the width of the developer housing and having a plurality of spaced apertures 27 extending generally in a line along the bottom thereof through which the toner is to be dispensed.

To transport fresh toner across the width of developer housing 10 to be dispensed through each of the apertures 27, an auger 28 is provided. This auger consists of a core 29 of metal or other material surrounded by a covering of open celled foam material 30 such as urethane foam. In addition, the foam is cut through or otherwise manufactured so as to form a helical channel or groove 31 around the periphery of the auger. As described in the above-mentioned patent application, auger 28 is sized to fit within tubular housing 26 with a slight amount of interference such that the foam will be slightly compressed within housing 26. Auger 28 is adapted to be driven into rotation by means of a motor schematically illustrated at 32. The primary function of auger 28 is to receive toner from toner supply portion 24 and to transport the toner into the developer assembly to be dispensed through the apertures. Specifically, toner held within the channels 31 of the auger are carried along the tubular member 26 during rotation of the auger, and, as the channels cross each of the apertures 27, a metered amount of toner will be dispensed through them to be mixed with the developer passing thereunder.

In the above-referred to patent application, the auger was designed to extend out of the end of tubular housing 26 and into the toner supply portion 24 so that the toner could be transferred into the developer assembly. In the present invention, however, the auger 28 has been sized to terminate at the end of the tubular member 26 as illustrated in FIG. 2. The tubular member 26 itself is preferably designed to extend slightly through an aperture 34 in the wall of housing 10 and aperture 34 is adapted to be closed by a valve plate or disc 33 which will be described in greater detail hereinafter. To complete the structure of toner dispensing portion 25, auger 28 is additionally provided with an axial pin 36 which extends through an opening in plate 33 and which has the function of releasably coupling dispensing portion 25 to toner supply portion 24 as will be amplified hereinafter.

Figure 3:
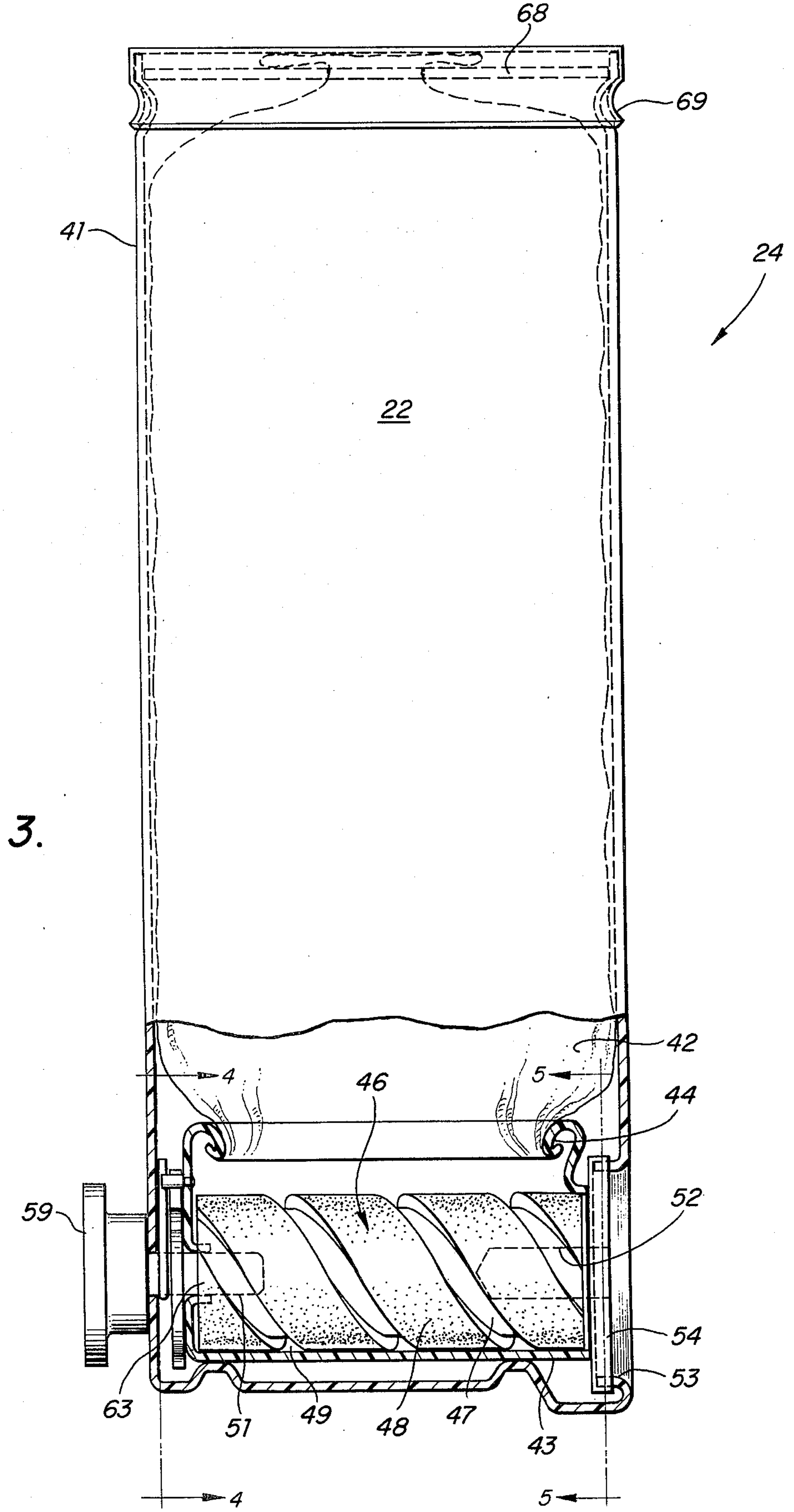
FIG. 3 illustrates the toner supply portion of the toner dispenser of the present invention.
Figure 4:
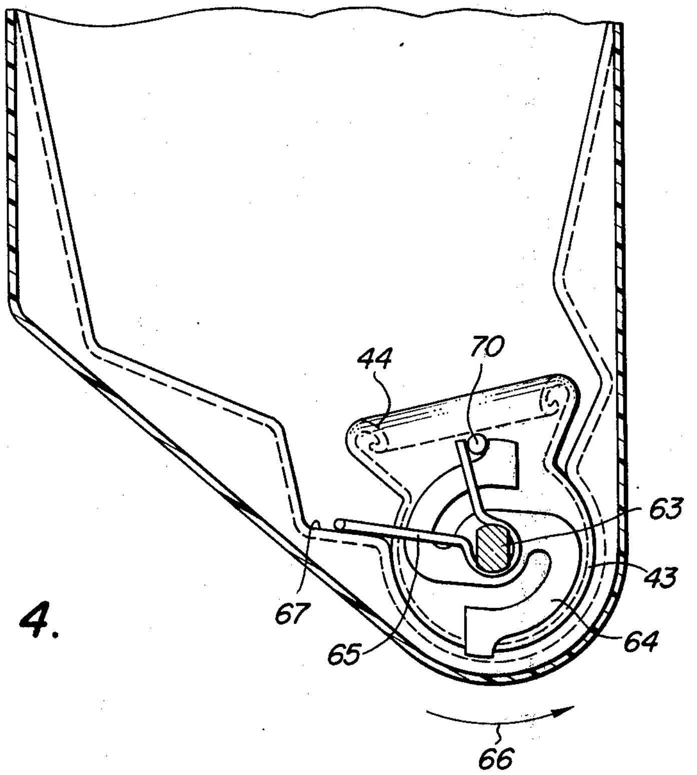
FIGS. 4 and 5 illustrate certain details of the toner supply portion of FIG. 3 looking in the direction of arrows 4—4 and 5—5, respectively, in FIG. 3.
Figure 5:
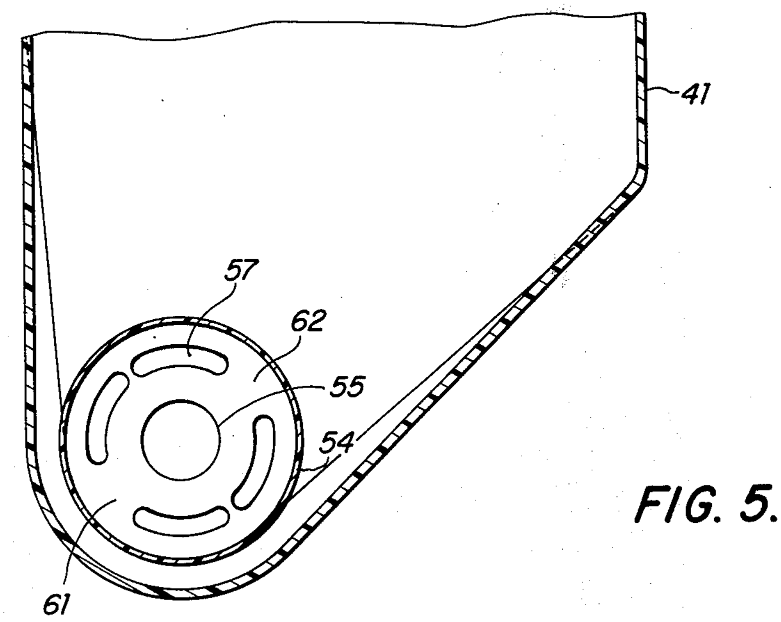

The details of the toner supply portion 24 are illustrated in FIGS. 3–5. From FIG. 3, it can be seen that the toner supply portion 24 is defined by a housing member 41 which is preferably formed of a relatively rigid, relatively transparent plastic material. Supported within and occupying a substantial portion of housing 41 is relatively flexible plastic bag 42 adapted to be filled with toner 22. Plastic bag 42 is supported at its top on an annular ledge 69 by providing a rigid card 68 inside the bag to rest on the ledge and by sealing the bag around the card. The bag 42 is open at its bottom end to supply toner into a tub-like member 43. As can be seen in FIGS. 3 and 4, tub 43 comprises a member which extends substantially across the width of housing 41 and is generally circular in cross-section although it is provided with an upper rim 44 to which the plastic bag 42 is attached. Specifically, the open bottom of bag 42 is bent around rim 44 and can be conveniently held in place by an O-ring clip or the like. Thus, the interior of tub 43 is in communication with the interior of plastic bag 42 such that toner 22 is free to spill into tub 43. The tub itself merely rests on the bottom of housing 41 and is not directly attached to the housing.

Supported within tub 43 is an auger portion 46 which is substantially identical to auger portion 28 (FIG. 2) and which includes a central core 47 and an outer surface 48 of urethane foam having a helical channel 49 formed around its periphery. Auger 46 substantially fills the tubular portion of tub 43 and is sized to be slightly compressed against the walls of the tub. On each end of auger 46, an axial bore is provided. Bore 51 is adapted to receive a knob 59, the function of which will be described hereinafter, while bore 52 is keyed to receive pin 36 (FIG. 2) such that the two auger portions 28 and 46 may be coupled together in the proper orientation for common rotation by motor 32. More particularly, housing 41 is provided with a circular aperture 53 adapted to be aligned with aperture 34 in developer housing 10 to provide communication between the two toner dispenser portions 24 and 25. Aperture 53 is closed by a valve plate or disc 54 similar to plate 33.

Plate 54 is illustrated more clearly in FIG. 5 which is a view of the toner supply housing 24 looking in the direction of arrow 5—5 in FIG. 3. As shown, plate 54 comprises a disc positioned within and closing aperture 53. It is provided with a central opening 55 through which pin member 36 (FIG. 2) is adapted to pass to lock the two auger portions together, and a series of elongated apertures 57 arranged in a circle around the central opening. Apertures 57 are positioned to be in alignment with the channels of the augers such that when the augers are rotating, toner can readily be transferred from the channels 49 of auger 43 to channels 31 of auger 28 through the apertures 57 in plate 54 and the corresponding apertures of plate 33. The principal function of the plates 33 and 54, however, are to operate as valve members to positively prevent toner from spilling out of either supply portion 24 or dispensing portion 25 when the two parts are separated for replacement of the supply portion. Specifically, they are provided with a pair of solid areas 61 and 62 which are also aligned with the channels on the augers. Therefore, by rotating the augers to a position in which the channels are aligned with areas 61 and 62, the passage of toner through the plates 33 or 54 will be effectively prevented and the two dispenser portions will be effectively sealed. Rotation of the augers can readily be accomplished by turning knob 59 to the appropriate position which can be indicated by a suitable mark on the housing 41. This valving structure, although very simple in design, has been proven quite effective in preventing toner spillage.

A further important feature of the present invention is illustrated in FIGS. 3 and 4. Specifically, as is known, toner is a very fine powder which tends to compact into a solid mass and not flow very freely. Accordingly, it is important that the toner supply housing 41 incorporate some suitable mechanism to agitate the toner in the housing to ensure that it will flow freely into and maintain the channels of auger 46 filled. In the previously mentioned patent application Ser. No. 542,319, one type of agitation structure was described. In the present invention, however, an alternative system is provided that is extremely reliable and yet formed of inexpensive parts. According to the present invention, agitation is created essentially by the interaction between the plastic bag 42 and the tub member 43. As mentioned previously, tub 43 is merely resting within the bottom of housing 41, and, since auger 46 is supported within it under a slight compression, rotation of the auger in the direction indicated by arrow 66 in FIG. 4, will cause the tub to similarly rotate in the same direction. In addition, an S-shaped cam 64 is secured to shaft 63 for rotation with the auger 46, and will also tend to push the tub into rotation by pressing against a small pin 70 extending from the end wall of tub 43. To oppose rotation of the tub 43, a relatively weak spring member 65 is provided and is wound around shaft 63. One end of the spring is adapted to cooperate with pin 70 while the other end is adapted to press against a surface 67 built into the housing 41.

The agitation structure operates as follows. In normal operation, rotation of the auger by motor 32 in the direction indicated by arrow 66, will cause the tub 43 to rotate with it due to the friction between the auger and the inner walls of the tub, and also (at times) as a result of being pushed by S-shaped cam 64 pressing against pin 70. As the tub rotates, pin 70 will eventually come into contact with the spring 65, and, with further rotation, the spring will begin to deform and oppose further rotation. At some point, the force of the spring will exceed the rigidity of the S-shaped cam 64 and the cam will suddenly deform and release the pin 70. At that instant, the deformed spring 65 will rapidly release its stored energy and drive the tub around in the opposite direction. Since the tub is attached to the plastic bag 42, the walls of the bag will be deflected and the toner in the bag will be agitated. After the force of the spring has been spent, the tub will again begin rotating in the direction of arrow 66 and the cycle will be repeated. Because there are two legs on the cam, there will be two agitations for every revolution of the auger. The plastic bag itself is supported adjacent its top on annular ledge or support 69. Thus, even as the bag empties, the walls of the bag will remain relatively taut so that the effect of its being deflected by the tub will provide sufficient agitation of the toner. The agitation, however, will be relatively gentle and not damage the toner in any way.

At this point, it is believed that it would be helpful to briefly review the overall operation of the toner dispenser of the invention. Initially, when motor 32 is actuated, auger 28 will be driven into rotation at a constant speed of about 20 r.p.m. Because it is coupled to auger 28 through pin 36, auger 46 will also be rotated in an identical manner. Toner carried in the channels 49 of auger 46 will thus be transferred along the length of auger 46, move through the apertures 57 of disc 54 and the corresponding apertures of disc 33, and enter into the channels of auger 28. The toner will then be carried across the developer housing and be dispensed through the apertures 27 in tubular member 26. During rotation of auger 46, the tub 43 will continuously be operating to agitate the toner in plastic bag 42 as described above, to ensure a continuous flow of toner into the channels of auger 46.

When, eventually, the supply of toner in housing 41 becomes exhausted, motor 32 is turned off to stop rotation of the augers. Knob 59 is then turned by hand, to rotate augers 28 and 46 to the position where the ends of their channels will be covered by the solid areas on plates 33 and 54 (e.g., areas 61 and 62 on plate 54). This will effectively seal the two dispenser portions and prevent toner spillage through apertures 34 and 53. The two dispenser sections may then be simply pulled apart (i.e., rod 36 removed from bore 52) and a completely new toner supply portion attached. By keying rod 36 with bore 52, alignment of the two parts can be accomplished rapidly and automatically. Motor 32 can then be turned on, and the copier will be again ready for use.

In conclusion, the toner dispenser according to the present invention results in a highly practical system eminently suitable for use in convenience copiers. It is extremely reliable yet utilizes only relatively inexpensive parts that can be replaced in their entirety when the supply of toner becomes exhausted. Because only the toner supply portion of the dispenser need be replaced, it is unnecessary to break into the developer housing itself.

While what has been described is a presently most preferred embodiment of the invention, it should be understood that the invention could take many other forms. For example, a toner conveyor system different from the auger design described could be incorporated into the system, if desired. Also, different systems could be employed to drive the tub 43. Inasmuch as many additions, modifications or omissions may be made without departing from the invention, it should be understood that the invention should be limited only insofar as required by the scope of the following claims.

What is claimed is:

1. A toner dispensing apparatus for dispensing toner into the developer housing of an electrophotographic copier comprising:

A. toner dispensing means for dispensing toner into said developer housing; and, B. toner supply means for maintaining a supply of toner to be dispensed by said toner dispenser means, said toner supply means including:
a. a container for holding toner, at least a portion of the walls of said container being flexible;
b. rotatable conveyor means for conveying toner from said container to said toner dispenser means; and,
c. means for deflecting said flexible wall portion for agitating the supply of toner maintained in said container, said deflecting means including:
1. tub means within which said rotatable conveyor means is supported, said tub means being normally rotatably with and by said conveyor means;
2. spring means for opposing the normal rotation of said tub means; and,
3. means for coupling said tub means to said conveyor means, said coupling means periodically releasing said tub means from said conveyor means whereby said tub means will be rapidly rotated by said spring means in the direction opposite that of said conveyor means to deflect said flexible wall portion.

2. Apparatus as recited in claim 1 wherein said coupling means comprises camming means for releasing said tub means when the opposing force applied by said spring means reaches a desired level.

3. Apparatus as recited in claim 2 wherein said camming means comprises an S-shaped cam for releasing said tub means twice during each revolution of said conveyor means.

4. Apparatus as recited in claim 1 wherein said container means comprises a bag having flexible walls and an opening adjacent the bottom end thereof and wherein said bag is coupled to said tub means through said opening to supply toner to said tub means for being received by said conveyor means supported therein.

5. Apparatus as recited in claim 4 and including means for supporting said bag adjacent the top end thereof for maintaining the walls thereof relatively taut.

6. In a toner dispensing apparatus for dispensing fresh toner into the developer housing of an electrophotographic copier including: a toner dispenser portion positioned within said developer housing for dispensing toner thereinto; a toner supply portion for supplying toner to said toner dispenser portion; and conveyor means positioned within both said toner dispenser portion and said toner supply portion for conveying toner from said toner supply portion to said toner dispenser portion to be dispensed therefrom, the improvement comprising wherein said conveyor means includes:
a. A first conveyor section positioned within said toner supply portion;
b. a second conveyor section positioned within said toner dispenser portion; and,
c. coupling means for releasably coupling said first and second conveyor sections together for joint rotation whereby said toner supply portion may be separated from said toner dispenser portion to permit replacement of said toner supply portion upon the exhaustion of the toner maintained therein.

7. Apparatus as recited in claim 6 wherein said toner supply portion is located exteriorly of said developer housing for ease in the replacement thereof.

8. Apparatus as recited in claim 6 wherein said toner dispensing portion and said toner supply portion each include valve means for preventing the leakage of toner therefrom upon their separation from one another.

9. Apparatus as recited in claim 8 wherein said valve means comprises disc means having a plurality of openings extending therethrough through which toner may pass to be conveyed from said first conveyor section to said second conveyor section and wherein said first and second conveyor sections include means for cooperating with each of said disc means for selectively closing said plurality of openings therein.

10. Apparatus as recited in claim 9 wherein said first and second conveyor sections comprise rotatable auger sections having helical channel means formed around their peripheral surfaces and wherein said apparatus further includes means for selectively rotating said first and second sections to a valve closing position wherein said channels are displaced from said openings in said disc means.

11. Apparatus as recited in claim 10 wherein said selective rotating means comprises manually operable knob means.

12. Apparatus as recited in claim 6 wherein said toner supply portion includes agitating means for agitating the supply of toner therein to maintain a smooth flow of toner to said first conveyor section to be transferred thereby to said second conveyor section.

13. Apparatus as recited in claim 12 wherein said agitating means includes a container for holding a supply of toner, at least a portion of said container having a flexible wall portion and means for periodically deflecting said flexible wall portion for agitating said toner within said container.

14. Apparatus as recited in claim 13 wherein said container comprises a plastic bag.

15. Apparatus as recited in claim 14 wherein said deflecting means comprises means associated with said first conveyor section for deflecting a wall of said bag during the rotation of said first conveyor section.

16. Apparatus as recited in claim 15 and including means for supporting said bag adjacent its top end for maintaining the walls thereof relatively taut.

* * * * *